S. B. ARNOLD.
SYSTEM OF POWER TRANSMISSION.
APPLICATION FILED NOV. 8, 1916.
1,286,899.
Patented Dec. 10, 1918.
4 SHEETS—SHEET 1.
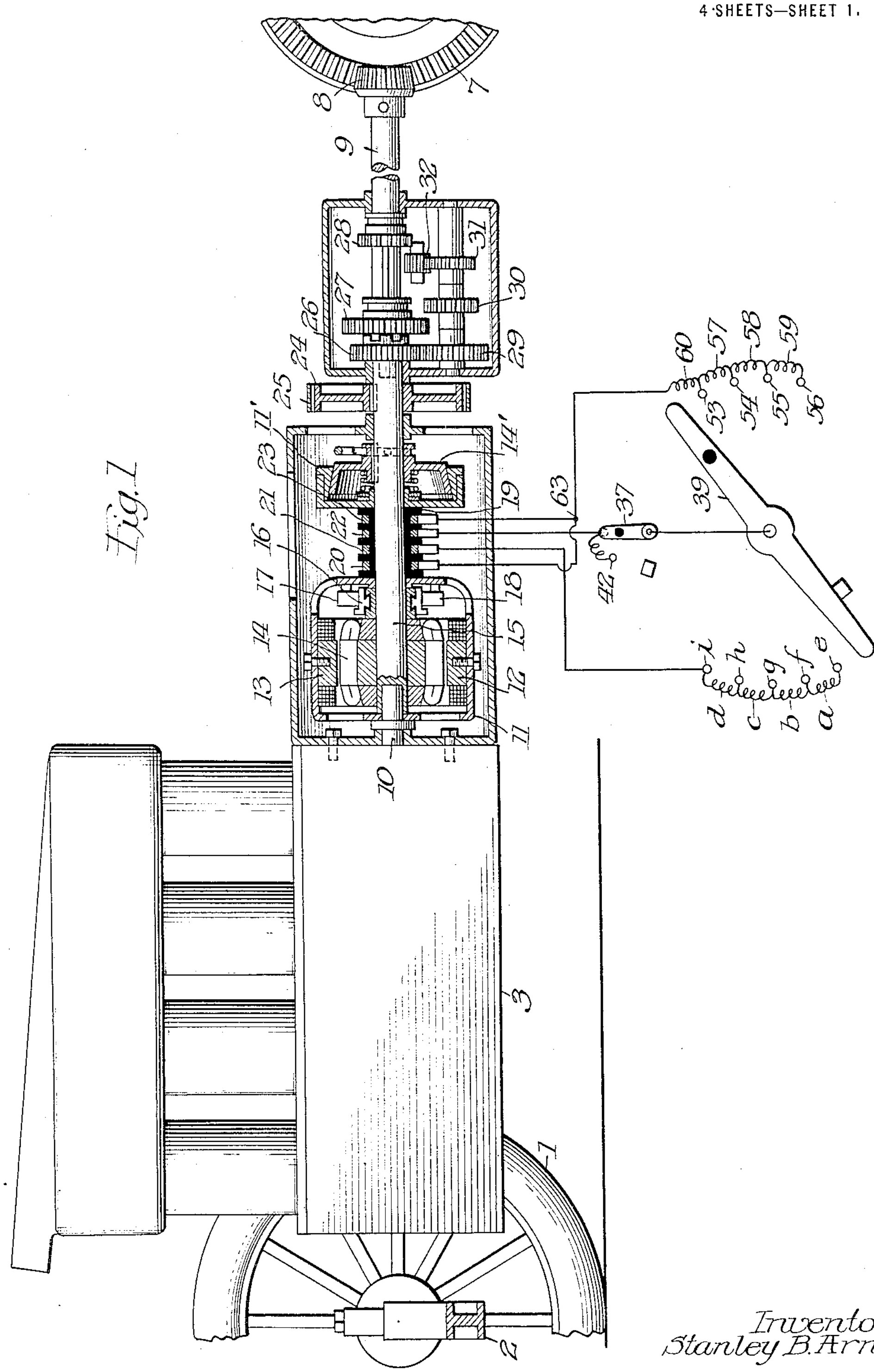
Inventor
Stanley B. Arnold
By G. L. Cragg
Atty S. B. ARNOLD.
SYSTEM OF POWER TRANSMISSION.
APPLICATION FILED NOV. 8, 1916.
1,286,899.
Patented Dec. 10, 1918.
4 SHEETS—SHEET 2.
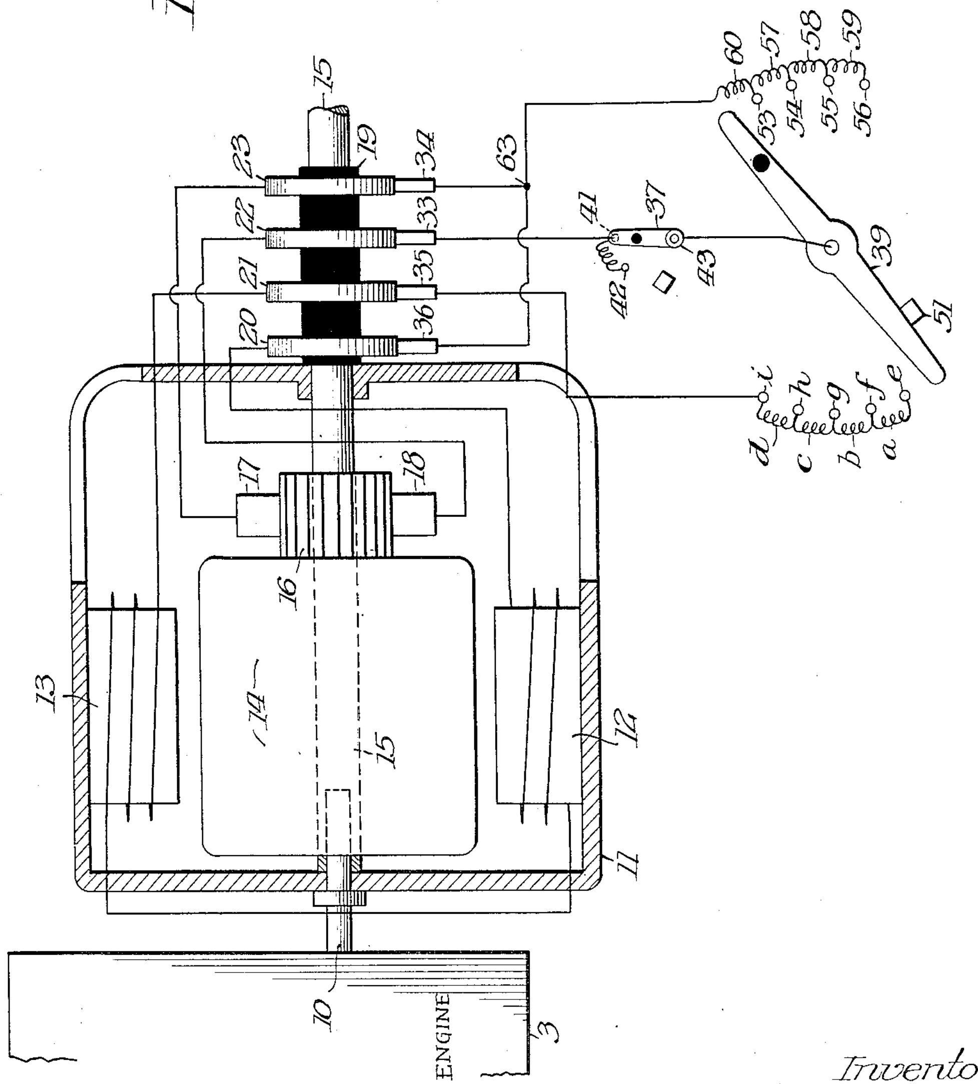
Inventor
Stanley B. Arnold
By G. L. Cragg
Atty S. B. ARNOLD.
SYSTEM OF POWER TRANSMISSION.
APPLICATION FILED NOV. 8, 1916.
1,286,899.
Patented Dec. 10, 1918.
4 SHEETS—SHEET 3.
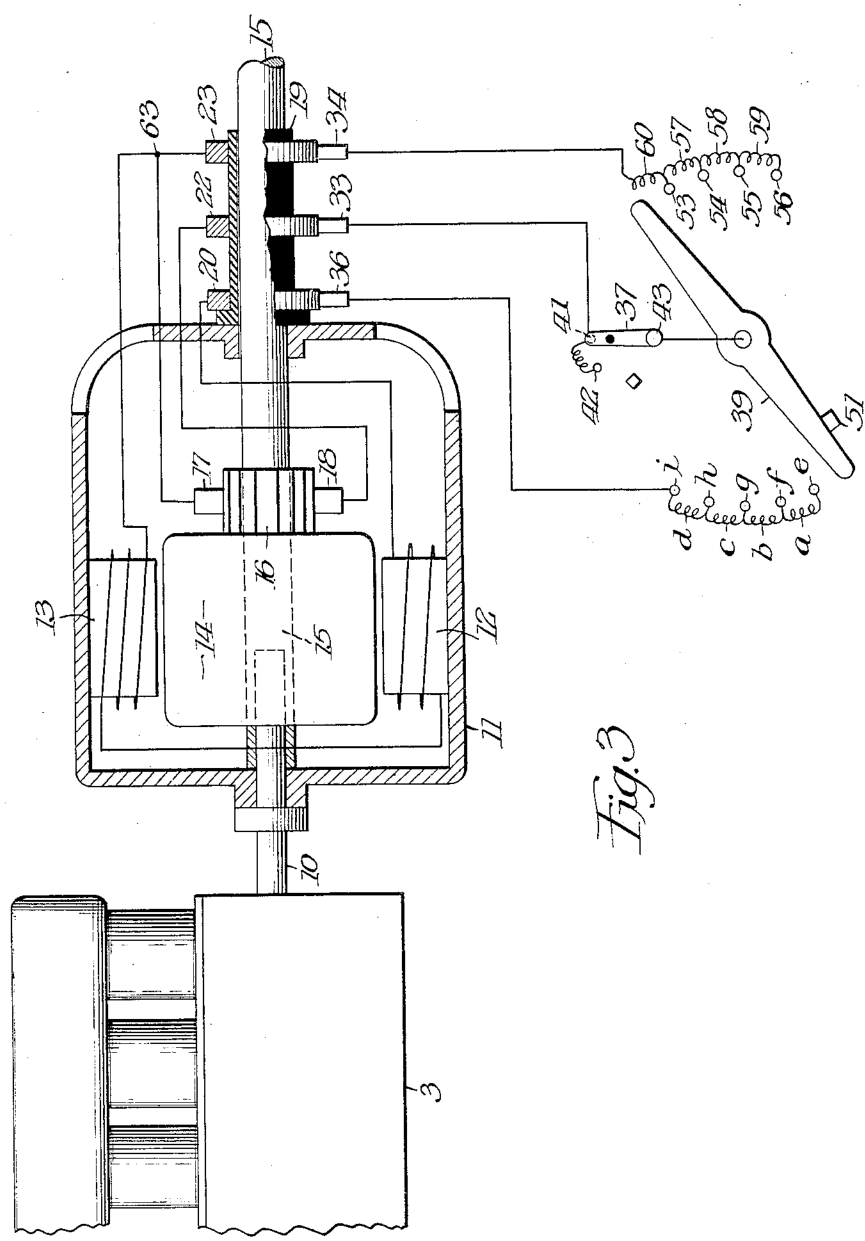
Inventor
Stanley B. Arnold
By G. L. Cragg
Atty S. B. ARNOLD.
SYSTEM OF POWER TRANSMISSION.
APPLICATION FILED NOV. 8, 1916.
1,286,899.
Patented Dec. 10, 1918.
4 SHEETS—SHEET 4.
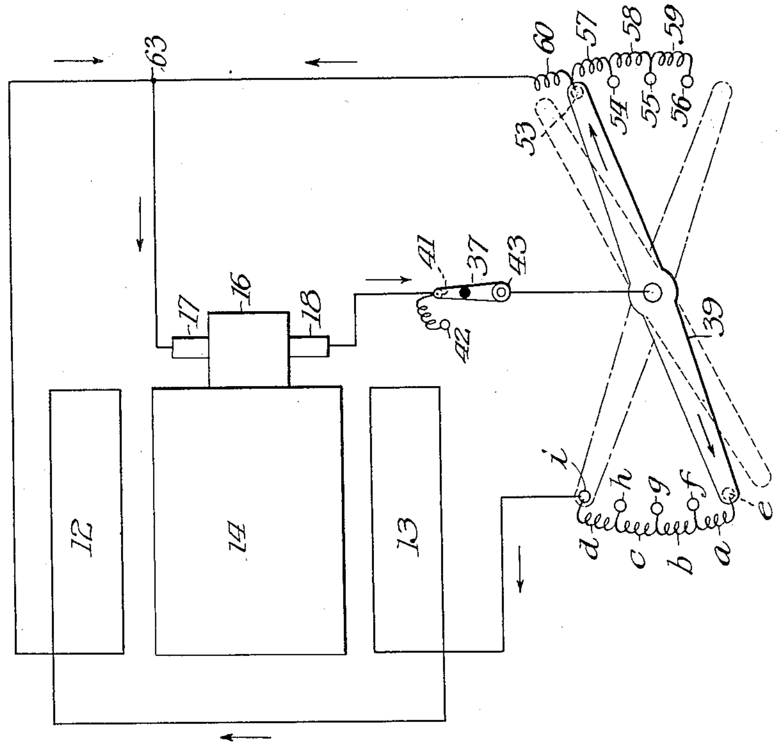
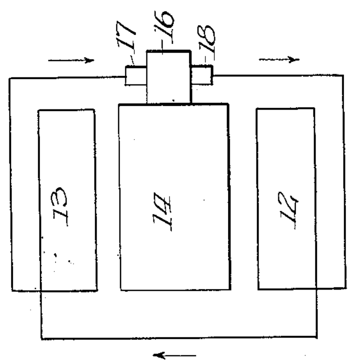
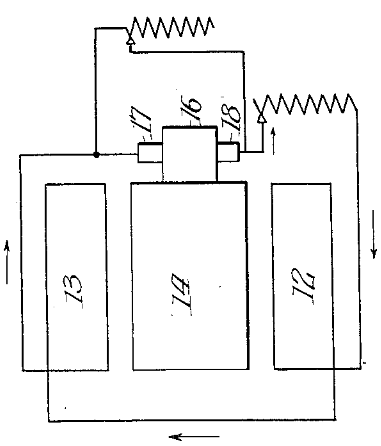
Inventor
Stanley B. Arnold
By G. L. Cragg Atty

UNITED STATES PATENT OFFICE.

STANLEY B. ARNOLD, OF CHICAGO, ILLINOIS.

SYSTEM OF POWER TRANSMISSION.

1,286,899. Specification of Letters Patent. Patented Dec. 10, 1918.

Application filed November 8, 1916. Serial No. 130,223.

*To all whom it may concern:*

Be it known that I, STANLEY B. ARNOLD, citizen of the United States, residing at Chicago, in the county of Cook and State of Illinois, have invented a certain new and useful Improvement in Systems of Power Transmission, of which the following is a full, clear, concise, and exact description, reference being had to the accompanying drawings, forming a part of this specification.

My invention relates to power transmission mechanism and resides in the employment of an electric current generator comprising armature and field members and acting as a clutching, releasing, starting and stopping medium between the prime mover and its load, both of the aforesaid members of the clutching generator being rotatable with respect to a point in space, one member being coupled with the load and the other being coupled with the prime mover.

In the preferred embodiment of the invention the armature member of the generator is coupled with the load and the field member thereof is coupled with the prime mover, the load being coupled with the prime mover through the agency of the regulable magnetic flux between the armature and field members of the generator. The two members of the generator are directly connected in circuit relation and without the intervention of any electric motor such as has hitherto been employed in establishing circuit relation between the rotating members of an electric clutch. There is also employed regulating dead resistance in direct shunt or parallel relation with the field generator member, the circuit, in all adjustments, being completed without including any electric motor.

The power transmission mechanism of my invention is of particular service when employed in the power plant of an automobile but the invention is not to be thus limited. By means of my invention the magnetic flux between the generator members may readily be regulated to regulate the slippage or relative speed between said members to effect the operation of the load at desired speed and torque. Where no means is employed for changing the direction of rotation of the generator members, and it being desired to provide means for changing the direction of the load with reference to the direction of rotation of the prime mover, there is also employed a mechanical reversing gear through which the clutching generator may operate the load in reverse direction. This reversing gear is normally out of service, there being suitable means for interposing it between the clutching generator and the load when the direction of travel of the load is to be reversed. This gear may also be employed in another use, in securing an adjustment of speed and torque of the load mechanically in the normal direction of load movement.

I also provide means whereby the clutching generator may be employed as a motor in starting the prime mover, there being desirably a storage battery which the generator may charge, the current from the battery being employed to operate the generator as a motor for the purpose stated.

The apparatus herein shown is more broadly claimed in my co-pending application Serial No. 130,222, filed Nov. 8, 1916, Case A, the present invention having for its object the movement of an additional regulating means such as a resistance to modify the action of the main controlling resistance upon the flow of current from the armature. In practising my invention the circuit has three divisions, one the armature division, another the field division, and a third the control division. The control division includes rheostat resistance as does also the field division, the control lever cutting out resistance from the field division as it includes resistance in the control division and vice versa. In the preferred embodiment of the invention each increase effected in the resistance of the control division is compensated for by a compensating decrease in the resistance in the field division and vice versa, whereby the aggregate resistance opposed to the flow of current at the armature brushes remains constant.

I will explain my invention more fully by reference to the accompanying drawings showing the preferred embodiment thereof and in which Figure 1 illustrates the adaptation of the invention to an automobile, the circuit arrangement being illustrated diagrammatically; Figs. 2 and 3 are diagrammatic illustrations; Figs. 4 and 5 illustrate some of the different circuit arrangements adapted to be produced by my circuit controlling mechanism; and Fig. 6 diagrammatically indicates the apparatus by which the circuit arrangements shown in Figs. 4 and 5 and other circuit arrangements may be secured.

Like parts are indicated by similar characters of reference throughout the different figures.

In Fig. 1 there is illustrated a part of an automobile of which there appears a portion of a front wheel 1 on an axle 2. The internal combustion hydrocarbon engine 3 or other prime mover is shown near the front of the automobile and is provided to drive the rear traction wheels or driving vehicle wheels. In the rear axle there is included the usual differential gearing mechanism to which is attached a bevel gear 7 that is in mesh with a bevel pinion 8, this bevel pinion being rigidly secured to the driving power transmitting shaft 9. The prime mover 3 is equipped with a shaft 10 on which the assembly piece or field frame 11 is mounted to turn, this assembly piece carrying the field portions 12 and 13 which, with the armature 14, constitute a dynamo electric machine whose armature and field portions are both rotatable with respect to a point in space as well as with respect to each other. This armature is mounted upon a shaft section 15 which fits over the projecting end of the shaft 10 to have bearing upon the shaft 10, the shafts 10 and 15 being rotatable with respect to each other. The shaft 15 also carries the commutator 16 that is located close to the armature 14. The assembly frame 11 carries the commutator brushes 17 and 18, these brushes being suitably insulated from the frame and being positioned to engage the commutator 16. The assembly frame 11 also carries a sleeve of insulation 19 upon which are mounted connecting rings 20, 21, 22 and 23 that are insulated from each other. Connecting ring 22 is connected with the positive set of brushes 18 and the connecting ring 23 is connected with the negative set of brushes 17. Connecting ring 21 is connected with one end of the field winding and connecting ring 20 is connected with the other end of the field winding. A friction brake drum 24 is rigidly secured to the shaft 15 and is embraced by a friction band 25. I have illustrated mechanical power transmission mechanism including gear elements 26, 27, 28, 29, 30, 31 and 32 which may be employed for securing a reverse drive and, as here shown, slow speed ahead and which may be employed to effect disengagement between the shafts 15 and 9 when it is desired to disconnect the driving vehicle wheels from the prime mover or the generator by mechanical means. The shaft 15, in addition to receiving the shaft 10 at one end, receives the shaft 9 at the other end, the shafts 9 and 15 being in rotatable relation and having bearing engagement with each other at their telescoping ends. The spur gear 26 is rigidly secured upon the shaft 15 and this gear 26 carries the teeth of one member of a dog clutch. Gears 27 and 28 are slidably mounted, as by means of a splined connection, on the shaft 9 but owing to their splined connection they rotate with such shaft. On the face of the gear 27 that opposes the gear 26 there are provided the teeth of the other member of the dog clutch so that when the gear 27 is moved toward the gear 26 these two gears will be coupled to cause the shaft 9 to rotate with the shaft 15 which are locked together by means of the members of the dog clutch. When the gear 27 is moved away from the gear 26 there is no mechanical connection between the shafts 9 and 15 by way of the dog clutch. Gear 26 is in mesh with the counter shaft gear 29 in rigid relation with the gears 30 and 31, the latter gear meshing with gear 32 upon another shaft. When the gear 27 is positioned so as not to mesh with gear 30 nor be located in connection with gear 26 and gear 28 is moved by suitable means to mesh with gear 32, the shafts 15 and 19 are mechanically connected through the gears 26, 29, 31, 32 and 28 by means of which the shafts 15 and 19 are rotated in reverse directions, this gearing being employed when it is desired to reverse the direction of travel of the automobile. Slow speed ahead is secured by bringing gear 27 into mesh with gear 30, gear 28 not then being in mesh with gear 32.

Electrical connection rings 22, 23, 21 and 20 are respectively engaged by brushes 33, 34, 35 and 36, these connection rings and their engaged brushes associating my circuit controller with the dynamo electric machine having the armature 14 and field portions 12 and 13.

A switch 37 is connected with the control lever 39, this switch being adapted to engage the buttons 41 and 42 at its upper end, the switch being pivoted at 43. The switch may also be turned to open circuit by being placed out of connection with both buttons 41 and 42. The resistance intervening between the buttons 41 and 42 acts to reduce the suddenness of the gap which is established between the brush 33 and the lever 39 when the lever 37 is being turned to open position. The right hand end of the control lever 39 rides over the rheostat buttons 53, 54, 55 and 56 to connect the right hand end of the lever 39 into circuit and successively to introduce dead resistance sections 60, 57, 58 and 59 in controlling relation with the field portion of the circuit, this controlling division of the circuit that contains said resistance sections being in parallel relation to the field member of the generator. Stop 51 limits the movement of the lever 39 in a counter-clockwise direction and when engaged by the lever 39, the control division of the circuit is out of service. The left hand end of the control lever 39 connects the resistance adjacent this end of the lever in another division of the circuit. This resistance is divided into sections *a*, *b*, *c*, *d* and has contact buttons *e*, *f*, *g*, *h* and *i* that are successively engaged by the left hand end of the control lever 39.

As most clearly illustrated in Fig. 6, the resistance sections *a*, *b*, *c*, *d* are adapted to be serially included in the field division of the circuit, one or more of these resistance sections being thus included according to the position of the control lever 39. As this figure also plainly indicates, the resistance sections 57, 58, 59 and 60 are in a control division of the circuit which is parallel with the field division of the circuit. A third division of the circuit is the armature division, one terminal of this armature division being directly connected with the lever 39 while the other terminal is directly connected at the point 63 where a terminal of the field division and a terminal of the control division of the circuit are connected. When lever 39 is moved to a closed circuit position (such as occurs when it engages contact button 53) current will flow from the armature through a circuit traceable from the armature through its commutator, brush 18, ring 22, the brush 33, the contact 41, the switch lever 37, the switch lever 39, where the current divides, one division of the current continuing through the right hand part of the lever, the particular resistance section in circuit with the lever 39 at its right hand end, the brush 34, the connecting ring 23, the brush 17, thence back to the armature 14. The other division of the current proceeds through the left hand end of the lever 39, the particular resistance section *a*, *b*, *c*, *d* connected with the left hand end of the lever, the brush 35, the connecting ring 21, the field winding 13, the field winding 12, the connecting ring 20, the brush 36, the brush 34, the connecting ring 23, the brush 17, to the armature 14.

As the lever 39 is moved in a clockwise direction from open circuit position shown by dotted lines in Fig. 4, the clutching action of the generator is brought into effect increasingly, such clutching action being increased each time a resistance section at the right hand end of the lever is included in circuit, the clutching action being greatest when the lever 39 is moved to its extreme position in a clockwise direction, and shown by dot and dash lines in Fig. 6, where all of such resistance sections are excluded from circuit, the control division of the circuit having these resistances then being open to establish the circuit condition shown in Fig. 4. Each time a resistance section is included in circuit at the right hand end of the lever 39, a section of a preferably compensating resistance is excluded from the field circuit at the left hand end of the lever 39 whereby the current flowing at the armature brushes 17 and 18 encounters the same aggregate resistance in all circuit closing positions of the lever 39, assuming that all resistance sections at both ends of the lever 39 are in compensating relation. However, it may be desired to have other ratios for the resistance sections and I do not wish to be limited to the maintenance of the same aggregate resistance encountered by the current flowing at the commutator brushes.

A comparatively small part of the current goes through the field division of the circuit through contact *e* (when lever 39 engages contacts *e* and 53) and the path described including the field windings. Consequently a comparatively weak magnetic field will be produced, assuming a given difference in speed between the generator members. The result of the magnetic field thus produced in the fields and armature is that the fields exert effort upon the armature to make it rotate in the same direction as that in which they are rotating and will cause the armature to so rotate if the resistance to its rotation be not too great. It is evident (continuing the stated assumption) that the magnitude of the turning effort exerted upon the armature by the fields will depend upon the strength of the magnetic field produced, which depends upon the amount of current flowing through the field winding. Suppose that control lever 39 is moved so that it makes contact with contacts *f* and 54. This reduces the resistance in the rheostat in the division of the circuit including the field windings, and increases the resistance in the control division of the circuit (that division including resistance sections 59, etc.). Thus the relative resistances of the control and field divisions of the circuit have been changed. Consequently more current will flow through the division containing the field windings and less through the control division, but the rheostat resistances at the ends of lever 39 are preferably so designed that the resistance opposing the flow of current at the armature brushes, that is between points 39 and 63, has not been changed. The result of this greater amount of current flowing through the field windings is that the magnetic field produced is of greater strength and consequently the turning effort exerted upon armature 14 is of greater magnitude. In like manner this turning effort is increased when control lever 39 is moved so that it makes contact with contact *g* and 55 and is still further increased when the control lever is moved so that it makes contact with contact *h* and 56. Moving the control lever in a clockwise direction simply decreases the resistance in the field division of the circuit and increases the resistance in the control division of the circuit. If control lever 39 is moved so that it makes contact with contact *i* it opens the control division of the circuit and consequently all of the current generated in the armature flows through control lever 39 and the field by way of contact *i*. Consequently a magnetic field of maximum strength is produced in the fields and armature and the turning effort exerted upon armature 14 is of maximum magnitude. If now the control lever be moved in the reverse direction a reverse action takes place, the magnetic field becoming of less and less strength as the control lever is moved across the various contacts until the control lever comes against stop 51 and breaks contact with both field and control divisions of the circuit, bringing the generator in open circuit to stop its clutching action to release the load. Thus, by moving lever 39 one way the prime mover can be made to exert turning effort in increasing amount upon the driven part and by moving it the other way the prime mover can be made to exert turning effort in decreasing amount upon the driven part and to exert no turning effort whatever upon the driven part. The point mostly of advantage about this method of control is that the resistance to the flow of current at the armature brushes is never greater than when the resistance is that of a series wound generator short-circuited, except when the circuit is broken or when rheostat and circuit breaker 37 is used as a rheostat. The purpose of rheostat and circuit breaker 37 as described before is to provide means of making and breaking the circuit gradually and independently of control lever 39 and it probably would be used only when such effect is desired. It is evident that when the resistance to the rotation of the armature is that of a load to be driven and when the current flowing through the field windings is sufficient to produce a sufficiently strong magnetic field the armature will rotate and drive the load. The speed at which the armature rotates and drives the load will depend (so long as the speed of rotation of the drive shaft of the prime mover remains the same) upon the strength of the magnetic field produced, which is controlled by moving the control lever 39. The stronger the magnetic field produced the less the difference in speed between the field and the armature will be and the weaker the magnetic field the greater the difference in speed will be, and as all the energy developed by the prime mover will be used in rotating the armature, except for the small amount used to generate the current in the circuit, the amount of energy transmitted to the armature and the driven shaft will be the same as that developed by the prime mover, except for the small amount used in generating the current and the small amount used in friction in the bearings and in resistance to the rotation of the various parts in the air. The amount of energy necessary in the passage of the current through the circuits will never be relatively very large because the resistance opposing the flow of current at the armature is never more than that of a series wound generator short-circuited, consequently the efficiency of this device as a transmission of power device will be very high. It is evident that if the speed of rotation of the drive shaft of the prime mover be increased the driven shaft will lag behind the drive shaft, as previously described, and in case the speed of rotation of the drive shaft of the prime mover be decreased the turning effort exerted upon the armature will decrease or become entirely absent, depending upon how much the speed of rotation of the drive shaft of the prime mover is decreased. It is evident that if the load that is being driven through this device varies an automatic action will take place between the prime mover and the load. If the load increases the speed of the driven shaft will lessen, and if the load decreases the speed of the driven shaft will increase, the speed of the driving shaft remaining nearly the same all of the time. This automatic action will take place regardless of the position of the control lever without attention from the operator.

Fig. 3 shows apparatus that accomplishes the same results that apparatus shown in Fig. 2 accomplishes, but with only three collector rings. Ring 20 is shown connected to one end of the field winding and ring 22 is connected to the positive set of brushes 18, and ring 23 is connected to the other end of the field winding and to the negative set of brushes 17, the dividing point of the conductors being at 63. The method of control is the same as hitherto set forth.

The friction clutch $11^1$, $14^1$ shown in Fig. 1, by means of which the driving and driven shafts 10 and 15 can be rigidly connected together, may or may not be used in combination with the electrical control equipment set forth, clutch members $11^1$, $14^1$ being respectively coupled with the field and armature.

In the equipment shown in Fig. 1 a braking appliance 24, 25 is shown. The control mechanism and circuits by which the prime mover may be started from the state of rest forms no part of the present case, having been fully set forth in my said co-pending application.

It will be observed that there is no electric motor employed in conjunction with my clutching generator and the prime mover, all suitable regulation being effected by means of the controlling arrangement illustrated and in which controlling arrangement the control division is made up of regulable dead resistances. The armature field and control divisions of the circuit are adapted for direct connection with each other. By this I mean that there is no electric motor in the circuit as has hitherto been used in certain electro-magnetic transmission of power devices and that when the generator is acting as a transmission of power device only there is no storage or other kind of battery in the circuit.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:

A power transmission system including a prime mover; an electric current generator whose armature and field members are both rotatable, one of these members being coupled with the prime mover and the other with the load; there being three circuit divisions, one division including the armature member of the generator, another division including the field member of the generator and the third division including variable regulating ohmic resistance, the second and third divisions being connected in parallel to each other and together in series with the division containing the armature member of the generator; a regulating ohmic resistance in the circuit division that includes the field member; and unitary means pertaining to the circuit divisions that contain the aforesaid regulating ohmic resistances for simultaneously varying the ohmic resistances of these circuit divisions, these resistances and said unitary means being so related that as the unitary means increases the resistance in either of these two circuit divisions it decreases the resistance in the other of such circuit divisions.

In witness whereof I hereunto subscribe my name this thirty-first day of October. A. D., 1916.

STANLEY B. ARNOLD.

Witnesses:

G. L. CRAGG,

ETTA L. WHITE.